United States Patent
Takase et al.

(10) Patent No.: US 10,286,871 B2
(45) Date of Patent: May 14, 2019

(54) AIRBAG UNIT

(71) Applicants: Fuji Heavy Industries Ltd., Tokyo (JP); TAKATA CORPORATION, Tokyo (JP)

(72) Inventors: Minoru Takase, Tokyo (JP); Ayanori Kunisawa, Tokyo (JP); Yoshiyuki Hashimoto, Tokyo (JP); Kazutaka Sugimoto, Tokyo (JP); Kazuhiro Abe, Tokyo (JP); Hideki Umeda, Tokyo (JP)

(73) Assignees: Fuji Heavy Industries Ltd., Tokyo (JP); TAKATA CORPORATION, Tokyo (JP)

( * ) Notice: Subject to any disclaimer, the term of this patent is extended or adjusted under 35 U.S.C. 154(b) by 0 days.

(21) Appl. No.: 15/119,665

(22) PCT Filed: Feb. 3, 2015

(86) PCT No.: PCT/JP2015/052932
§ 371 (c)(1),
(2) Date: Aug. 17, 2016

(87) PCT Pub. No.: WO2015/125599
PCT Pub. Date: Aug. 27, 2015

(65) Prior Publication Data
US 2017/0008484 A1    Jan. 12, 2017

(30) Foreign Application Priority Data
Feb. 19, 2014  (JP) .................. 2014-029771

(51) Int. Cl.
*B60R 21/36* (2011.01)
*B60R 21/34* (2011.01)

(52) U.S. Cl.
CPC ........ *B60R 21/36* (2013.01); *B60R 2021/346* (2013.01)

(58) Field of Classification Search
CPC ...................................................... B60R 21/36
See application file for complete search history.

(56) References Cited

U.S. PATENT DOCUMENTS 6,857,495 B2 * 2/2005 Sawa .................... B60R 21/36
                                                       180/274
7,341,274 B2   3/2008 Mori et al.
(Continued)

FOREIGN PATENT DOCUMENTS

DE    102005040358 A1 * 3/2006   ............ B60R 21/36
DE    102006034552 A1 * 2/2007   ............ B60R 21/36
(Continued)

OTHER PUBLICATIONS

International Search Report dated Apr. 28, 2015 for PCT/JP2015/052932 and English translation of the same (4 pages).
(Continued)

*Primary Examiner* — Nicole T Verley
(74) *Attorney, Agent, or Firm* — Fitch, Even, Tabin & Flannery LLP (57) ABSTRACT

An airbag unit is provided that can be easily installed and removed. The airbag unit includes an airbag that covers, upon being unfolded, at least a part of a hood or a windshield outside a vehicle, a gas generator that ejects gas into the airbag, a cover bottom member that accommodates therein the airbag yet to be expanded and the gas generator, a cover lid member that covers the cover bottom member in which the airbag is accommodated, and a bracket removably supported by the body of the vehicle, and removably supporting the cover bottom member and the cover lid member.

4 Claims, 11 Drawing Sheets

(56) References Cited

U.S. PATENT DOCUMENTS

| | | | |
|---|---|---|---|
| 7,584,988 B2 | 9/2009 | Okamoto et al. | |
| 7,770,684 B2 | 8/2010 | Takimoto et al. | |
| 8,016,066 B1 | 9/2011 | Boxey | |
| 9,016,425 B1 * | 4/2015 | Choi | B60R 21/34 |
| | | | 180/274 |
| 2006/0042854 A1 | 3/2006 | Sasaki et al. | |
| 2008/0314672 A1 * | 12/2008 | Takimoto | B60R 21/36 |
| | | | 180/274 |
| 2012/0319387 A1 * | 12/2012 | Kim | B60R 19/205 |
| | | | 280/770 |
| 2014/0318881 A1 * | 10/2014 | Sugimoto | B60R 21/237 |
| | | | 180/274 |
| 2016/0311395 A1 * | 10/2016 | Hara | B60R 21/38 |

FOREIGN PATENT DOCUMENTS

| | | | | |
|---|---|---|---|---|
| DE | 102007062683 A1 * | 7/2008 | | B60R 21/36 |
| DE | 20 2011 052 110 U1 | 12/2012 | | |
| EP | 3012161 A1 * | 4/2016 | | B60R 21/20 |
| JP | 2003-165402 A | 6/2003 | | |
| JP | 2005-349954 A | 12/2005 | | |
| JP | 2006-62488 A | 3/2006 | | |
| JP | 2007-106156 A | 4/2007 | | |
| JP | WO 2007085918 A1 * | 8/2007 | | B60R 21/215 |
| JP | WO 2007086246 A1 * | 8/2007 | | B60R 21/36 |
| JP | 2008-213523 A | 9/2008 | | |
| JP | 4433845 B2 * | 3/2010 | | |
| JP | 4517869 B2 * | 8/2010 | | |
| JP | 4744278 B2 * | 8/2011 | | |
| JP | 4779640 B2 * | 9/2011 | | |
| JP | 4843442 B2 * | 12/2011 | | |
| JP | 5954129 B2 * | 7/2016 | | |
| JP | 5983641 B2 * | 9/2016 | | B60R 21/217 |
| WO | 2007/085919 A1 | 8/2017 | | |

OTHER PUBLICATIONS

Extended European Search Report dated Aug. 28, 2017, issued in corresponding European Patent Application No. 15752194.9. (8 pages).

* cited by examiner

AIRBAG UNIT

CROSS-REFERENCE TO RELATED APPLICATIONS

This application is a U.S. National Phase Patent Application of International Patent Application Number PCT/JP2015/052932, filed on Feb. 3, 2015 which claims priority of Japanese Patent Application Number 2014-029771, filed Feb. 19, 2014, which are hereby incorporated herein by reference in their entirety.

TECHNICAL FIELD

The present invention relates to a technical field of an airbag unit, to be expanded and unfolded to outside of a vehicle by gas from a gas generator such as an inflator in an emergency case, for example when the vehicle collides with an object, to thereby mitigate an impact applied to the object and the vehicle.

BACKGROUND ART

An airbag has thus far been known that expands to a rear side of the bonnet of the vehicle and outer side of the pillars when the vehicle collides with a pedestrian or the like, to mitigate the impact of recollision between the pedestrian and the vehicle.

For example, an airbag unit is disclosed that includes an airbag module disposed between the rear edge of the bonnet hood and the front edge of the cowl top so as to extend in a left-right direction of the vehicle body, and supported by a damper housing having high rigidity, so as not to interfere with an air inlet and a wiper (see, for example, PTL 1).

CITATION LIST

Patent Literature

PTL 1: Japanese Unexamined Patent Application Publication No. 2006-62488

SUMMARY OF INVENTION

The airbag unit according to PTL 1 is, however, located on the forward side of the cowl top, and has a length corresponding to the size of the hood in the vehicle width direction between the bonnet hood and the cowl top. Therefore, installation and removal of the airbag unit in and from the vehicle body is troublesome.

The present invention has been accomplished in view of the foregoing situation, and provides an airbag unit that can be easily installed and removed.

In an embodiment, an airbag unit includes:
an airbag that covers, upon being unfolded, at least a part of a hood or a windshield outside a vehicle;
a gas generator that ejects gas into the airbag;
a cover bottom member that accommodates therein the airbag yet to be expanded and the gas generator;
a cover lid member that covers the cover bottom member in which the airbag is accommodated; and
a bracket removably supported by a body of the vehicle, and removably supporting the cover bottom member and the cover lid member.

In another embodiment, the airbag unit may further include a stopper fixed to at least one of the cover bottom member, the cover lid member, and the bracket, so as to oppose a surface of the cover bottom member and the cover lid member extending in a longitudinal direction.

In another embodiment of the airbag unit, the stopper may be fixed to the cover bottom member and the cover lid member on a side of the hood.

In another embodiment of the airbag unit, a cover bottom plate of the cover bottom member and the bracket may be formed such that a central portion in the longitudinal direction is elevated upward with respect to end portions.

The airbag unit according to the embodiment includes:
the airbag that covers, upon being unfolded, at least a part of the hood or the windshield outside the vehicle;
the gas generator that ejects gas into the airbag;
the cover bottom member that accommodates therein the airbag yet to be expanded and the gas generator;
the cover lid member that covers the cover bottom member in which the airbag is accommodated; and
The bracket removably supported by the body of the vehicle, and removably supporting the cover bottom member and the cover lid member. Such a configuration enables the airbag unit to be easily installed and removed, simply by attaching the bracket to the vehicle body in the assembly work.

The airbag unit according to the embodiment further includes the stopper fixed to at least one of the cover bottom member, the cover lid member, and the bracket, so as to oppose the surface of the cover bottom member and the cover lid member extending in the longitudinal direction. Such a configuration prevents the longer side of the cover bottom member and the cover lid member from being collapsed or deformed owing to the pressure applied when the airbag is expanded.

In the airbag unit according to the embodiment, the stopper is fixed to the cover bottom member and the cover lid member on the side of the hood, and therefore the airbag can be prevented from intruding into a space under the hood upon being expanded.

In the airbag unit according to the embodiment, the cover bottom plate of the cover bottom member and the bracket are formed such that the central portion in the longitudinal direction is elevated upward with respect to the end portions. Such a configuration allows a larger space to be secured for the engine room located thereunder.

BRIEF DESCRIPTION OF DRAWINGS

FIG. 5($a$) is a plan view and FIG. 5($b$) is a front view, each showing the airbag unit according to the embodiment attached to the bracket.

DETAILED DESCRIPTION OF THE PREFERRED EMBODIMENTS

Hereafter, embodiments of the present invention will be described with reference to the drawings.

Figure 1:
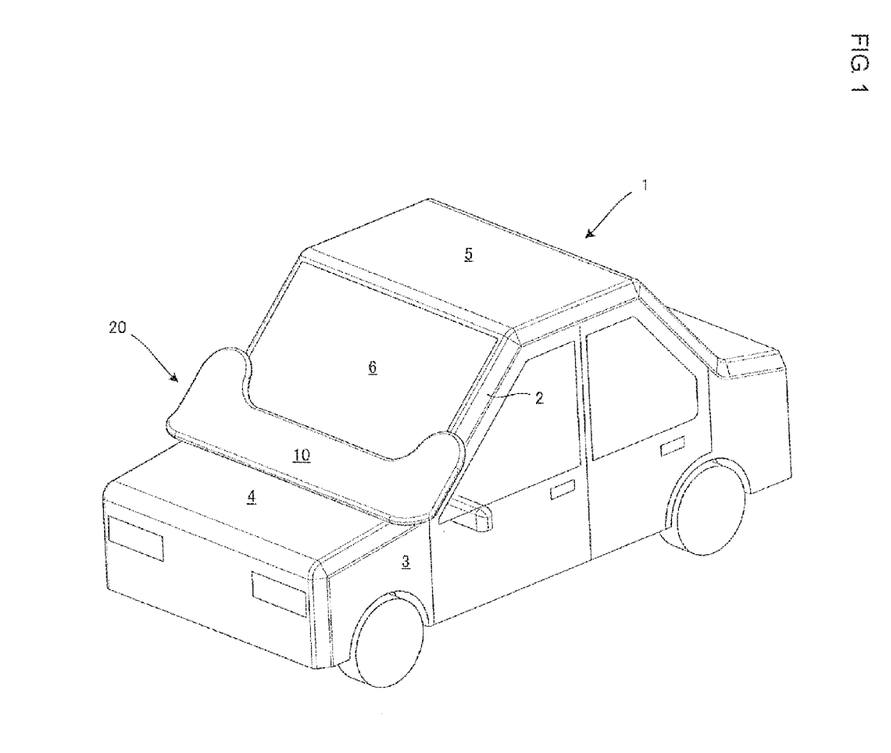
FIG. 1 is a perspective view showing a vehicle in which an airbag unit according to an embodiment has been activated.
Figure 2:
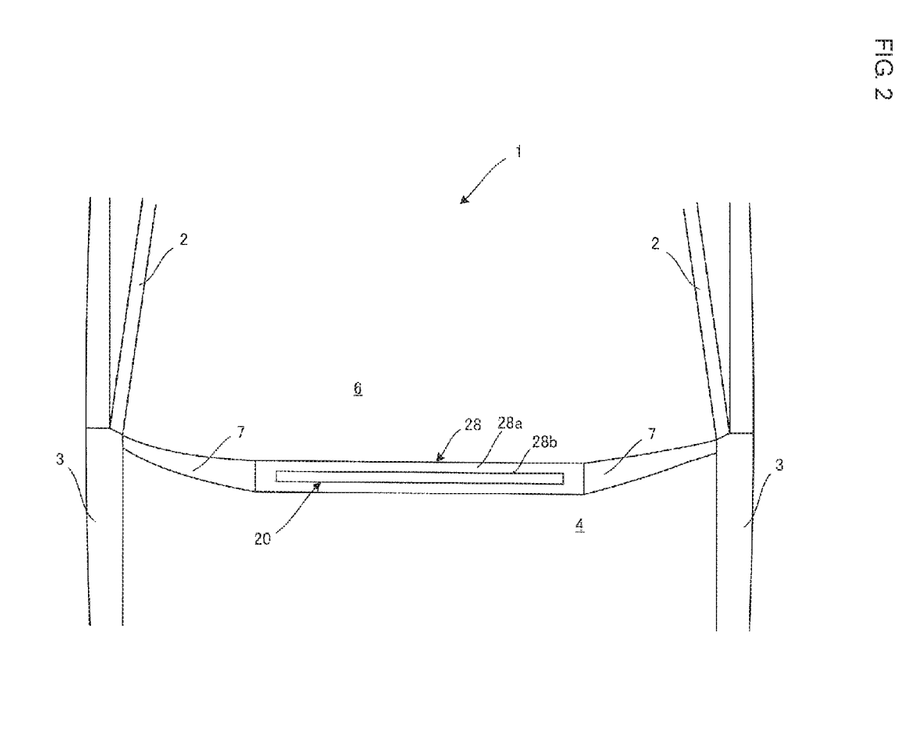
FIG. 2 is a fragmentary plan view of the vehicle in which the airbag unit according to the embodiment is unactivated yet.

FIG. 1 illustrates a vehicle in which an airbag unit according to an embodiment has been activated. FIG. 2 illustrates a part of the vehicle in which the airbag unit according to the embodiment is unactivated yet. With respect to the vehicle shown in FIG. 1, the vehicle width direction will be defined as first direction A, and the front-back direction orthogonal to the first direction A will be defined as second direction B.

As shown in FIG. 1, after the airbag unit 20 according to this embodiment is unfolded, an airbag 10 assumes a U-shape so as to cover a part of front pillars 2 of the vehicle 1, a part of a hood 4, and a part of a windshield 6. The airbag 10 may be configured to assume an I-shape extending in the width direction of the vehicle 1 so as to cover a part of the hood 4 and a part of the windshield 6.

As shown in FIG. 2, the airbag unit 20 yet to be activated is installed in a gap between the hood 4 and the windshield 6, and between cowl tops 7 on the respective sides. The airbag unit 20 is covered with a cowl cover 28 including an opening 28b formed in a central region of a main body 28a. The airbag 10 shown in FIG. 1 flies out through the opening 28b to be expanded.

Therefore, the airbag unit 20 can be located at the position corresponding to the cowl top 7 of the vehicle 1, so as to effectively utilize the space. In addition, the airbag 10 is located closer to an upper region of the windshield 6 to be reached by the airbag 10 upon being unfolded, and therefore the airbag 10 can be quickly unfolded as far as the upper region of the windshield 6.

Figure 3:
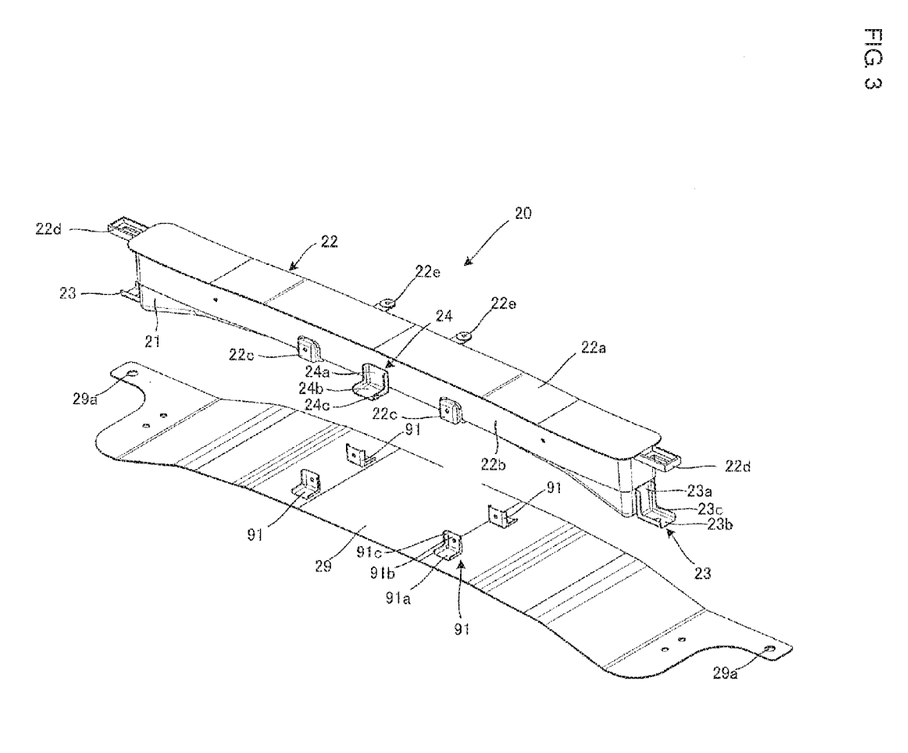
FIG. 3 is a perspective view showing the airbag unit and a bracket according to the embodiment.
Figure 4:
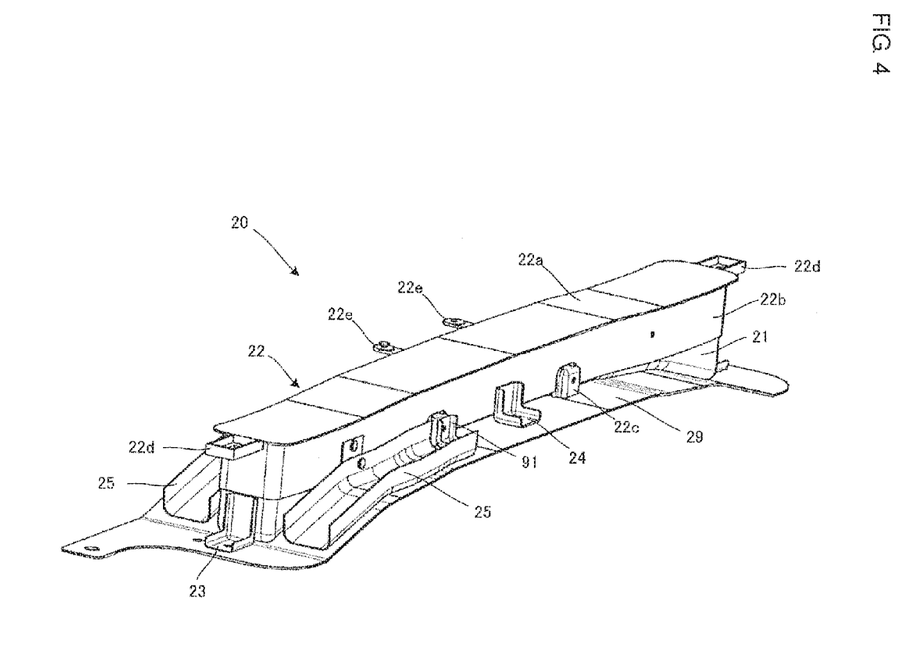
FIG. 4 is a perspective view showing the airbag unit according to the embodiment, attached to the bracket.
Figure 5:
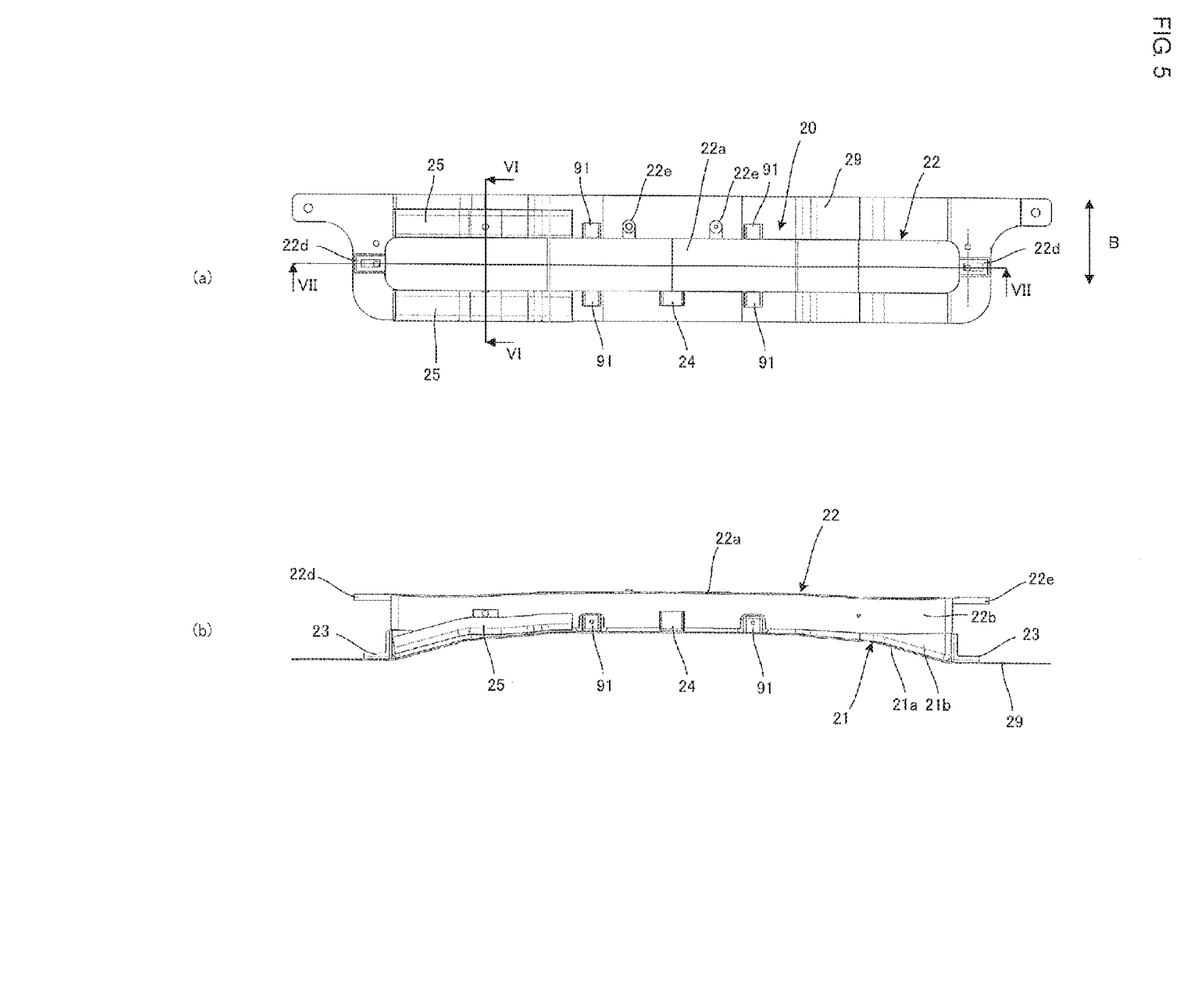
Figure 6:
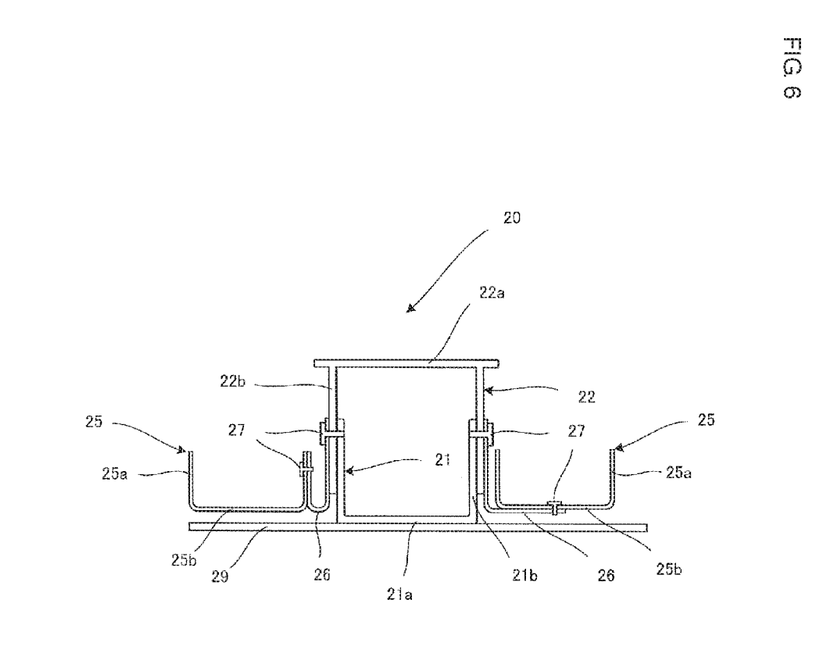
FIG. 6 is a cross-sectional view taken along a line VI-VI in FIG. 5.
Figure 7:
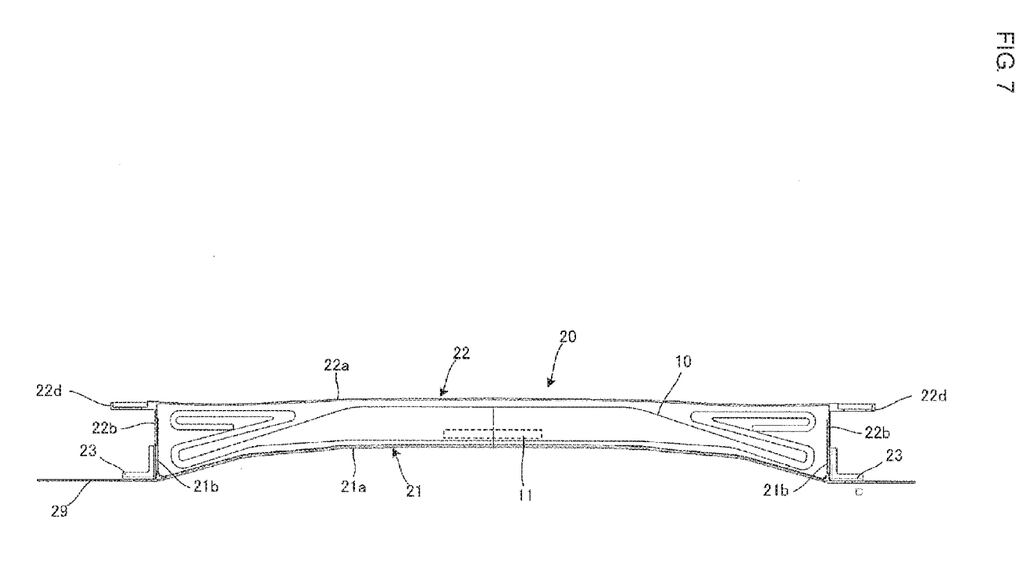
FIG. 7 is a cross-sectional view taken along a line VII-VII in FIG. 5.

FIG. 3 illustrates the airbag unit and a bracket according to the embodiment. FIG. 4 is a perspective view showing the airbag unit according to the embodiment, attached to the bracket. FIG. 5(a) is a plan view and FIG. 5(b) is a front view, each showing the airbag unit according to the embodiment attached to the bracket. FIG. 6 is a cross-sectional view taken along a line VI-VI in FIG. 5. FIG. 7 is a cross-sectional view taken along a line VII-VII in FIG. 5.

The airbag unit 20 according to this embodiment includes the airbag 10, a gas generator 11, a cover bottom member 21, and a cover lid member 22. The airbag unit 20 is attached to the vehicle body via the bracket 29.

The cover bottom member 21 includes a cover bottom plate 21a, and cover lower walls 21b erected upward from the respective side edges of the cover bottom plate 21a. The cover bottom member 21 accommodates therein the folded airbag 10 and the gas generator 11 provided inside the airbag 10. The cover bottom plate 21a and the cover lower walls 21b of the cover bottom member 21 may be either integrally formed, or formed of separate components assembled together.

The cover bottom plate 21a is formed such that a central portion in the longitudinal direction is elevated upward with respect to end portions. Accordingly, the upper end of the cover lower wall 21b is substantially linearly formed such that a central portion is slightly higher than the end portions, in other words the distance between the upper end and the lower end is longer at the end portions than at the central portion.

The cover lid member 22 includes a cover lid plate 22a, cover upper walls 22b each extending downward from a position slightly inside of a side edge of the over lid plate 22a, first fastening pieces 22c each projecting in a width direction from a lower position of an outer surface of the cover upper wall 22b, second fastening pieces 22d each projecting in the vehicle width direction from the cover lid plate 22a, and third fastening pieces 22e projecting in the width direction from the same side of the cover lid plate 22a.

The cover lid plate 22a is a plate-shaped component, formed such that a central portion in the longitudinal direction is slightly elevated upward with respect to end portions. The cover upper wall 22b has an inner perimeter of a similar shape to the outer perimeter of the cover lower wall 21b but slightly larger, and is fitted around the outer perimeter of the cover lower wall 21b.

The first fastening pieces 22c are engaged with the bracket 29. The second fastening pieces 22d and the third fastening pieces 22e are engaged with the cowl cover 28.

The bracket 29 is a plate-shaped component formed so as to fit the surface shape of the cover bottom plate 21a of the cover bottom member 21 of the airbag unit 20, in other words such that a central portion in the longitudinal direction is elevated upward with respect to end portions. The bracket 29 includes fixing holes 29a formed in the vicinity of the respective end portions in the longitudinal direction. The bracket 29 is fixed to the vehicle body by inserting a screw or a pin in each of the fixing holes 29a and fastening the screw or pin thereby combining the bracket 29 to the vehicle body.

Forming thus the bracket 29 such that the central portion in the longitudinal direction is elevated upward with respect to the end portions allows a larger space to be secured for the engine room located thereunder. Preferably, the height of the elevation is at least 20 mm.

First supporting pieces 91 are attached to the bracket 29. The first supporting piece 91 is an L-shaped component formed by bending a plate at the right angle, and one section 91a is attached to the bracket 29 by welding or the like so that the other section 91b is vertically or generally vertically erected on the upper face of the bracket 29. The airbag unit 20 is placed with the first fastening piece 22c provided on the cover upper wall 22b of the cover lid member 22 opposed to the other section 91b of the first supporting piece 91, and fastened with a screw or pin. The first supporting piece 91 includes flanges 91c formed on the respective L-shaped end portions by bending at the right angle with respect to the one section 91a and the other section 91b. The flanges 91c contribute to enhancing the strength.

Fourth fastening pieces 23 of an L-shape, formed by bending a plate at the right angle like the first supporting piece 91, are attached to the cover bottom member 21. One section 23a of the fourth fastening piece 23 is attached to a shorter side of the cover lower wall 21b by welding or the like, and the other section 23b is attached to the upper face of the bracket 29. The fourth fastening piece 23 includes flanges 23c formed on the respective L-shaped end portions by bending at the right angle with respect to the one section 23a and the other section 23b. The flanges 23c contribute to enhancing the strength.

As described above, the airbag unit 20 can be attached to the bracket 29 in advance, and therefore the airbag unit 20 can be installed simply by attaching the bracket 29 to the vehicle body, in the assembly work. In addition, in the event of repair the bracket 29 does not have to be removed from the vehicle body but only the cover bottom member 21 and the cover lid member 22 have to be removed. Therefore, the airbag unit 20 can be easily removed or installed.

The cover lid member 22 includes an L-shaped stopper 24 formed by bending at the right angle a plate having higher strength than the first supporting piece 91. One section 24a of the stopper 24 is attached to a longer side of the cover upper wall 22b of the cover lid member 22 by welding or the like, and the other section 24b is attached to the upper face of the bracket 29. The stopper 24 of the cover lid member 22 includes flanges 24c formed on the respective L-shaped end portions by bending at the right angle with respect to the one section 24a and the other section 24b. The flanges 24c contribute to enhancing the strength. Here, the stopper 24 may be attached to only one of the cover upper wall 22b and the bracket 29, so that the other may be disposed so as to oppose the stopper 24.

The mentioned configuration prevents the longer side of the cover lower wall 21b of the cover bottom member 21 and the cover upper wall 22b of the cover lid member 22 from being collapsed or deformed owing to the pressure applied when the airbag 10 is expanded, to thereby prevent the airbag 10 from intruding into a space under the hood 4.

Further, water receptacles 25 are attached to the respective longer sides of the cover bottom member 21 and the cover lid member 22. The water receptacle 25 is formed in a shape like a rain gutter having a U-shaped cross-section. The portion of the water receptacle 25 between a central portion and an end portion along the longitudinal direction of the cover lid member 22 is inclined downward.

The water receptacle 25 is attached with a fixing piece 27 such as a pin to the cover bottom member 21 and the cover lid member 22, via a receptacle supporting plate 26. The receptacle supporting plate 26 may be formed, for example, in a U-shape, and one end portion thereof may be fixed to the cover bottom member 21 and the cover lid member 22 and the other end portion may be fixed to a sidewall 25a of the water receptacle 25. Alternatively, the receptacle supporting plate 26 may be formed in an L-shape, in which case an end portion may be fixed to the cover bottom member 21 and the cover lid member 22, and the other end portion may be fixed to a bottom plate 25b of the water receptacle 25. Examples of the fixing piece 27 include, in addition to the pin, a screw and a rivet, and alternatively welding may be adopted. Here, it suffices that the water receptacle 25 is attached to at least one of the cover bottom member 21 and the cover lid member 22.

Providing thus the water receptacle 25 allows water flow to be directed toward a lateral portion of the engine room.

The airbag 10 is folded with the gas generator 11 enclosed therein in advance, and stored in the cover bottom member 21. Although the airbag 10 is unfolded to a width corresponding to the width of the vehicle 1 as shown in FIG. 1, the airbag 10 is folded to a narrower width as shown in FIG. 2 when installed. Accordingly, it is preferable to fold the airbag 10, as shown in FIG. 7, so as to superpose a portion to be located on the outer side of the cover bottom member 21 in the vehicle width direction, on each end portion in the longitudinal direction of the cover bottom member 21, corresponding to the vehicle width direction at the time of the installation.

Folding the airbag 10 as above increases the expansion speed of the portion to be located on the outer side of the cover bottom member 21 in the vehicle width direction. When the airbag 10 is folded as above, each of the end portions of airbag 10 in the longitudinal direction of the cover bottom member 21 becomes thicker than the central portion. However, the central portion of the cover bottom plate 21a of the cover bottom member 21 in the longitudinal direction is elevated with respect to the end portions, so that a deeper storage space is secured on each end portion of the cover bottom member 21 in the longitudinal direction than in the central portion, and therefore the airbag 10 can be properly stored.

Figure 8:
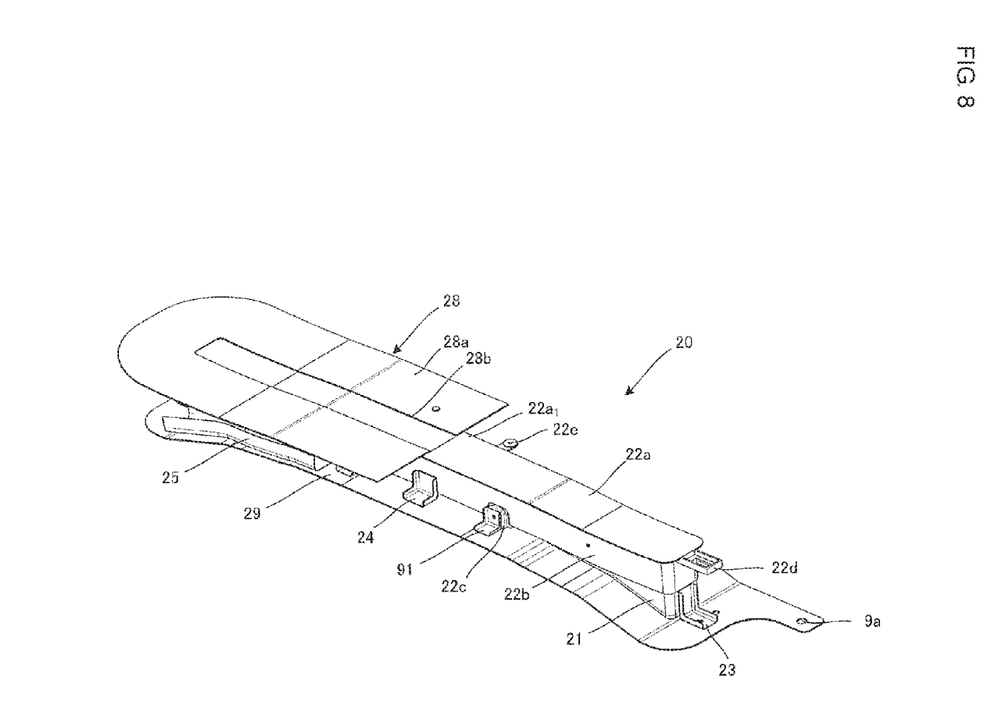
FIG. 8 is a perspective view showing the airbag unit according to the embodiment, with a cowl cover attached thereto.
Figure 9:
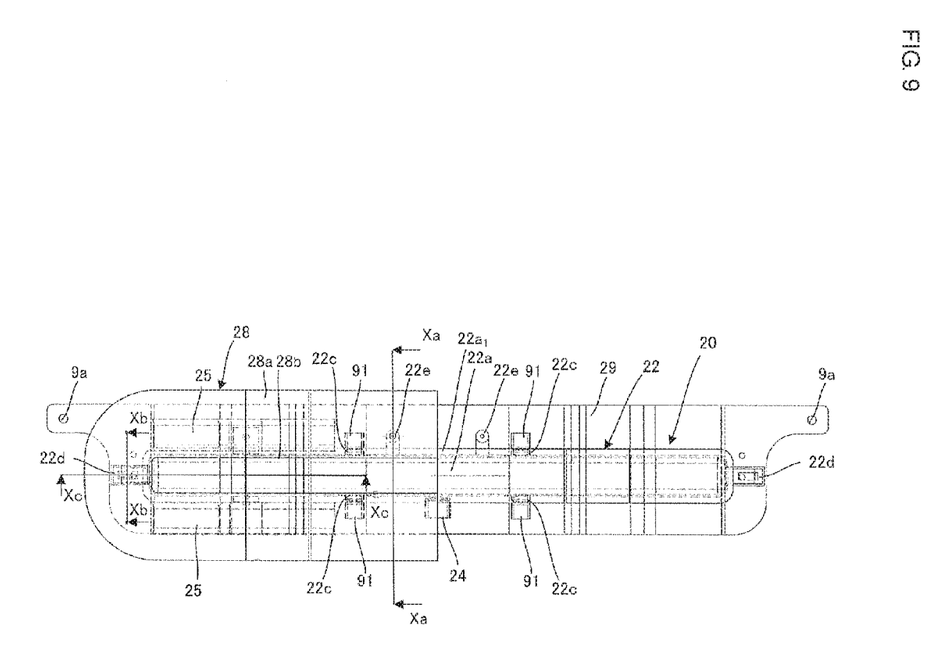
FIG. 9 is a plan view showing the airbag unit according to the embodiment, with the cowl cover attached thereto.
Figure 10:
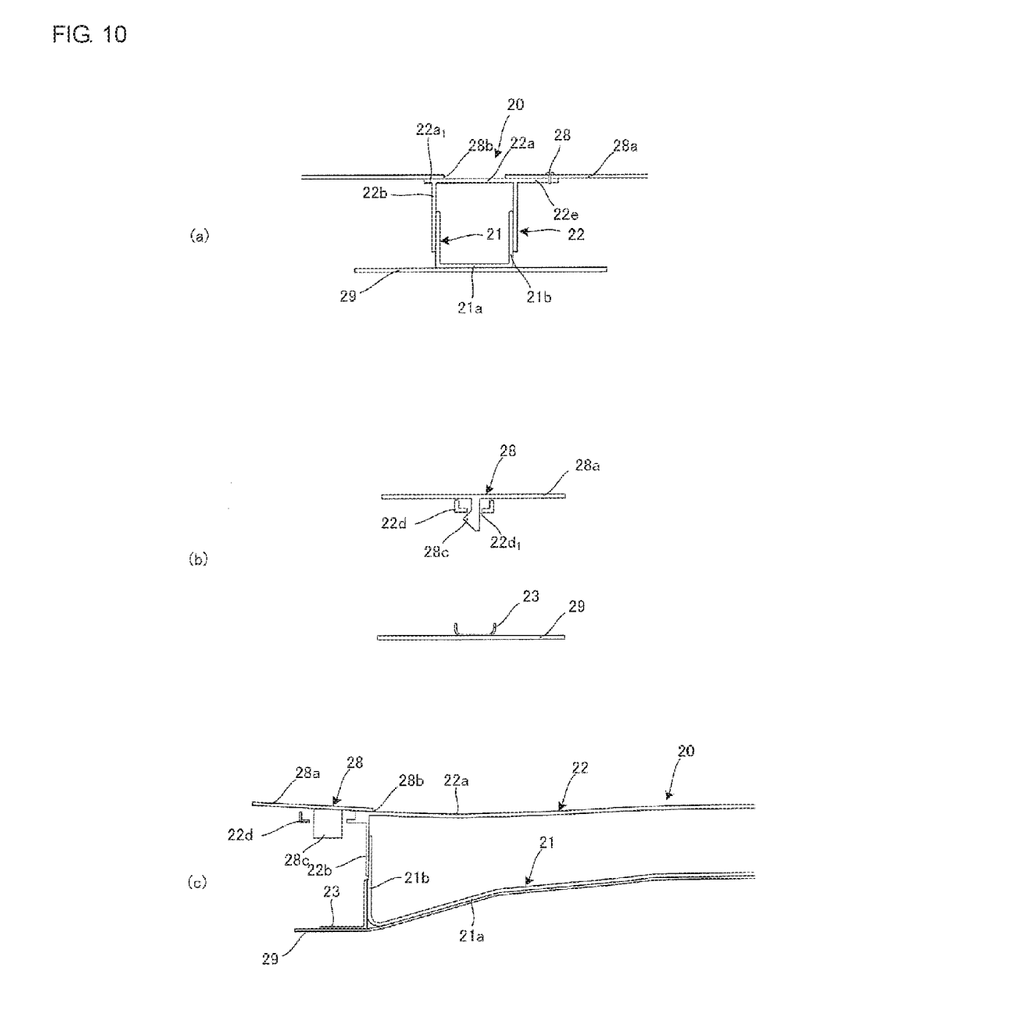
FIG. 10(a), FIG. 10(b), and FIG. 10(c) are cross-sectional views respectively taken along lines Xa-Xa, Xb-Xb, and Xc-Xc in FIG. 9.

FIG. 8 is a perspective view showing the airbag unit according to this embodiment, with the cowl cover attached thereto. FIG. 9 is a plan view showing the airbag unit according to this embodiment, with the cowl cover attached thereto. FIG. 10 includes cross-sectional views taken along lines X-X in FIG. 9.

FIG. 10(a) is a cross-sectional view taken along a line Xa-Xa in FIG. 9. FIG. 10(b) is a cross-sectional view taken along a line Xb-Xb in FIG. 9. FIG. 10(c) is a cross-sectional view taken along a line Xc-Xc in FIG. 9.

The upper face of the airbag unit 20 according to this embodiment is covered with the cowl cover 28. However, since the opening 28b is formed in the central region of the main body 28a of the cowl cover 28, a part of the cover lid plate 22a of the cover lid member 22 is exposed to outside. It is preferable that, at the time of expansion, the cover lid plate 22a is opened at the position corresponding to the opening 28b of the cowl cover 28.

The cowl cover 28 is a plate-shaped component, formed in the same surface shape as that of the cover lid plate 22a of the cover lid member 22. Accordingly, when the cowl cover 28 is attached to the airbag unit 20, the cowl cover 28 and a peripheral edge $22a_1$ of the cover lid plate 22a overlap and contact each other along the periphery of the opening 28b. In this state, as shown in FIG. 10(a), the portion of the cover lid plate 22a corresponding to the opening 28b is recessed downward from the surface of the cowl cover 28 by an amount corresponding to the thickness of the cowl cover 28, in a cross-sectional view in the width direction of the cover lid member 22. Here, it is preferable that a fine gap for drainage is formed between the cowl cover 28 and the cover lid plate 22a.

The cowl cover 28 is attached via the second fastening pieces 22d and the third fastening pieces 22e of the cover lid member 22. It is preferable that the upper faces of the second fastening pieces 22d and the third fastening pieces 22e are flush with the upper face of the cover lid plate 22a.

The second fastening pieces 22d are formed so as to stick out from the respective end portions in the longitudinal direction. The second fastening pieces 22d each include a hole $22d_1$, so that the cowl cover 28 is attached to the cover lid member 22 through engagement between the hole $22d_1$ and an engaging portion 28c of the cowl cover 28 as shown in FIG. 10(b).

The third fastening pieces 22e are formed so as to stick out from at least one side in the width direction. The cowl cover 28 is attached to the third fastening pieces 22e with a screw, a pin, or a rivet.

Attaching thus the cowl cover 28 to the cover lid member 22 allows the airbag unit to be located between the hood 4 and the window 6, where normally the cowl top 7 is located, thereby enabling effective utilization of the space. In addition, it is only the cowl cover 28 that has to be processed, and therefore the airbag unit can be retrofitted to an existing vehicle.

In addition, since the cowl cover 28 is attached to the cover lid member 22 so as to overlap along the periphery of the opening 28b, even though the position of the cowl cover is slightly shifted, the positional shift is barely recognized visually, and therefore an impact to the appearance can be minimized.

Further, although the portion of the cover lid plate 22a corresponding to the opening 28b is recessed downward from the surface of the cowl cover 28 by an amount corresponding to the thickness of the cowl cover 28, in a cross-sectional view in the width direction of the cover lid member 22, a fine gap is formed between the cowl cover 28 and the cover lid member 22, and therefore water can be drained downward through the gap instead of being deposited, and discharged through the water receptacle 25.

Figure 11:
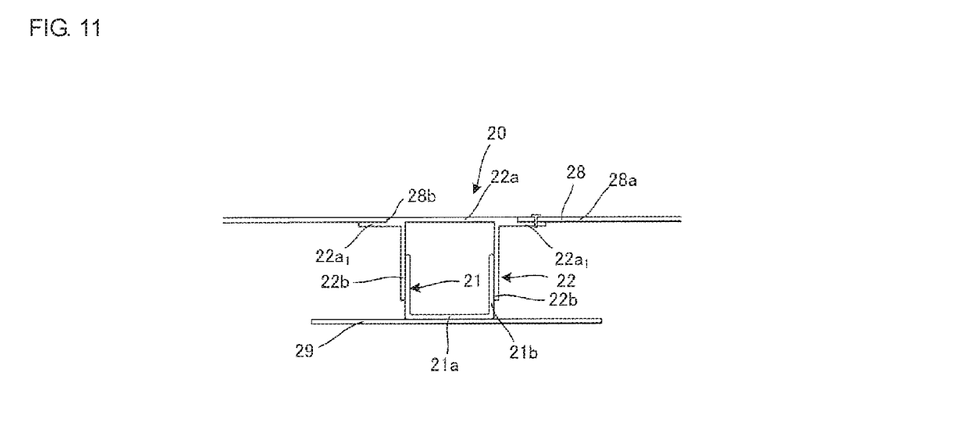
FIG. 11 is a cross-sectional view showing another embodiment.

FIG. 11 illustrates another embodiment of the cover lid member 22.

In the embodiment shown in FIG. 11, the cover lid member 22 includes the peripheral edge $22a_1$ formed along the periphery thereof. The peripheral edge $22a_1$ constitutes a stepped portion recessed from the upper face of the cover lid plate 22a by an amount corresponding to the thickness of the cowl cover 28. Upon attaching the cowl cover 28 so as to overlap the peripheral edge $22a_1$, the upper face of the cowl cover 28 and that of the cover lid plate 22a become flush, or generally flush, with each other. Such a configuration improves the visual appearance of the airbag unit 20 installed in the vehicle 1.

As described thus far, the airbag unit 20 according to the foregoing embodiment includes the airbag 10 that covers, upon being unfolded, at least a part of the hood 4 or the windshield 6 outside the vehicle 1, the gas generator 11 that ejects gas into the airbag 10, the cover bottom member 21 that accommodates therein the airbag 10 yet to be expanded and the gas generator 11, the cover lid member 22 that covers the cover bottom member 21 in which the airbag 10 is accommodated, and the bracket 29 removably supported by the body of the vehicle 1, and removably supporting the cover bottom member 21 and the cover lid member 22. Such a configuration enables the airbag unit to be easily installed and removed.

The airbag unit 20 according to the embodiment further includes the stopper 24 fixed to at least one of the cover bottom member 21, the cover lid member 22, and the bracket 29, so as to oppose the surface of the cover bottom member 21 and the cover lid member 22 extending in the longitudinal direction. Such a configuration prevents the longer side of the cover bottom member 21 and the cover lid member 22 from being collapsed or deformed owing to the pressure applied when the airbag 10 is expanded.

In the airbag unit 20 according to the embodiment, the stopper 24 is fixed to the cover bottom member 21 and the cover lid member 22 on the side of the hood 4, and therefore the airbag 10 can be prevented from intruding into a space under the hood 4 upon being expanded.

In the airbag unit 20 according to the embodiment, the cover bottom plate 21a of the cover bottom member 21 and the bracket 29 are formed such that the central portion in the longitudinal direction is elevated upward with respect to the end portions. Such a configuration allows a larger space to be secured for the engine room located thereunder.

The configurations described above are merely exemplary embodiments of the airbag unit 20 of the present invention, and the elements of the airbag unit 20 may be modified or combined in various manners within the scope of the appended claims.

The invention claimed is:

1. An airbag unit comprising:
   an airbag that covers, upon being unfolded, at least a part of a hood or a windshield outside a vehicle;
   a gas generator that ejects gas into the airbag;
   a cover bottom member that accommodates therein the airbag yet to be expanded and the gas generator;
   a cover lid member that covers the cover bottom member in which the airbag is accommodated; and
   a bracket removably supported by a body of the vehicle, and removably supporting the cover bottom member and the cover lid member;
   wherein
   the cover lid member has a mounting part that projects from at least one side of the cover lid member in a width direction thereof to engage with a cowl cover disposed in an area between the hood and the windshield of the vehicle, with the mounting part being mounted in contact with a lower portion of the cowl cover,
   the airbag travels through an opening formed in a central region of the cowl cover during inflation.

2. The airbag unit according to claim 1, further comprising a stopper fixed to at least one of the cover bottom member, the cover lid member, and the bracket, so as to oppose a surface of the cover bottom member and the cover lid member extending in a longitudinal direction.

3. The airbag unit according to claim 2,
   wherein the stopper is fixed to the cover bottom member and the cover lid member on a side of the hood.

4. The airbag unit according to claim 1,
   wherein a cover bottom plate of the cover bottom member and the bracket may be formed such that a central portion in the longitudinal direction is elevated upward with respect to end portions.

* * * * *